INVENTORS.
William R. Seitz, &
BY Arnold O. DeHart
Robert J. Outland
ATTORNEY

INVENTORS.
William R. Seitz, &
Arnold O. DeHart
BY Robert J. Outland
ATTORNEY

United States Patent Office 3,490,312
Patented Jan. 20, 1970

3,490,312
EXPANSIBLE CHAMBER DEVICE WITH HYDRO-
DYNAMIC BEARING PUMP AND LIMITED SLIP
DIFFERENTIAL EMPLOYING SAME
William R. Seitz and Arnold O. DeHart, Rochester, Mich.,
assignors to General Motors Corporation, Detroit,
Mich., a corporation of Delaware
Filed May 31, 1968, Ser. No. 733,696
Int. Cl. F16d 13/04, 19/00; F16h 1/44
U.S. Cl. 74—711                              14 Claims

ABSTRACT OF THE DISCLOSURE

A preferred emobodiment comprises a hydraulic limited slip differential having friction clutch means to restrict relative rotation of the side and pinion gears relative to one another and to the differential case. The clutch means are actuated by hydraulic actuators comprising expansible chamber devices incorporating hydrodynamic bearing pump means. The bearing pump means develop hydaulic pressure during relative rotation of the gears and transmit it through passages to the hydraulic actuators which actuate the clutch or clutches.

FIELD OF THE INVENTION

This invention relates to hydrodynamic bearing pump means, to expansible chamber devices actuable by such means, to friction clutch arrangements actuable by such devices and to limited slip differentials utilizing such clutch arrangements.

DESCRIPTION OF THE PRIOR ART

It is known in the art to use a limited slip differential in the drive train of a vehicle to provide for the delivery of substantial driving torque to a drive wheel having traction in spite of the loss of traction of the other drive wheel due, for example, to operation on an icy surface. Among the types of limited slip differentials presently in common use are those in which clutch means between the side gears and the differential case are loaded by springs urging the clutch means outwardly against the case. Additional loading of the clutch means is commonly provided by the separating force acting outwardly on the side gears due to the delivery of driving torque to them from the differential pinion gears.

While differentials of this character have given generally satisfactory service they have sometimes exhibited problems of audible chatter of the clutch means as well as excessive wear. These problems have been controlled by the use of special lubricants and careful design but it has been realized that they could be made much less critical by substantially reducing the spring pre-load force so as to reduce the actuating force on the clutch means at times when resistance to differential action is unnecessary. Unfortunately, such reduction in many current differential designs would substantially reduce the effectiveness of the differential when starting on a slippery surface.

The prior art contains many designs of hydraulic limited slip differentials which operate to vary the resistance to relative rotation of the drive axle in proportion to the difference in rotational speed between them. One such an arrangement is shown in United States Patent No. 2,949,-792 to Smith in which hydraulic pump means are operated by relative rotation of the drive axles and develop hydraulic pressure which is used to actuate clutch means to resist the drive axle relative rotation. Such hydraulic arrangements have the advantage that they cause little or no resistance to differential action during normal turning movements and operation of a vehicle since the relative rotation of the drive axles is too slow to develop a substantial hydraulic pressure. However, when one wheel loses traction and spins, a substantial pressure may be developed and exerted against the clutches, reducing or limiting the speed differential and permitting the transfer of substantial torque to the other wheel. Such arrangements would obviously reduce or eliminate the problems of chatter and wear under normal operating conditions. They have not however been generally adopted due to their relative complex construction and resultant high cost.

BRIEF DESCRIPTION OF THE INVENTION

The present invention provides hydraulically actuated limited slip differential arrangements having the advantages of such units but utilizing simple clutch means actuated by expansible chamber devices employing simple but effective novel hydrodynamic bearing pump means. These units are uncomplicated and compact, lending themselves to relatively inexpensive manufacture and accordingly overcome this shortcoming or prior hydraulic limited slip differentials.

Thus, it is in an object of this invention to provide simple hydrodynamic bearing pump means operable to develop substantial hydraulic pressures to be transmitted to an external actuator.

Another object of this invention is to provide expansible chamber devices connectible with hydrodynamic bearing pump means.

Still another object of the invention is to provide expansible chamber devices incorporating hydrodynamic bearing pump means.

Yet another object of this invention is to provide clutch means for resisting relative rotation of a pair of members and having hydraulic actuating means including an expansible chamber device actuated by fluid pressure from hydrodynamic bearing pump means.

A further object of the invention is to provide limited slip differential arrangements having clutch means for resisting relative rotation of the output members, said clutch means being actuated by hydraulic actuating means including expansible chamber devices supplied with pressure fluid by hydrodynamic bearing pump means.

These and other objects of the invention will be more fully understood from the following description of certain preferred embodiments of the invention taken together with the accompanying drawings.

DESCRIPTION OF THE PREFERRED EMBODIMENTS

Figures 1, 2, 3:
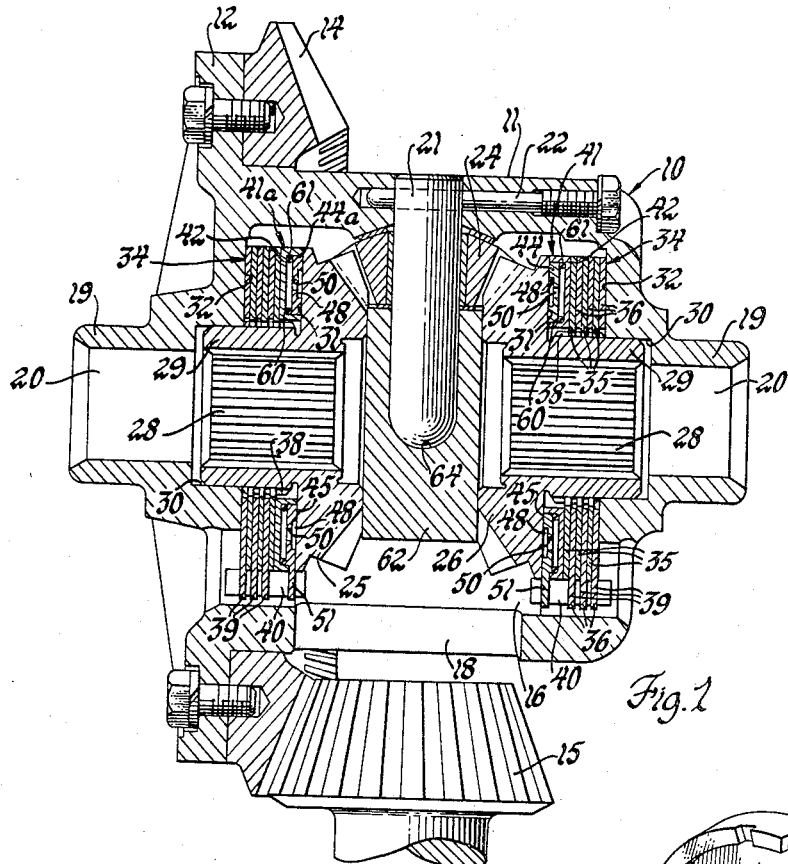
FIGURE 1 is a cross-sectional view of a limited slip differential having means according to the invention, the portions of the figure on opposite sides of the rotational axis of the differential case showing sections taken in planes disposed at 90° to one another.
FIGURE 2 is an enlarged pictorial view showing one of the expansible chamber devices of the differential of FIGURE 1 and its incorporated hydrodynamic bearing pump means.
FIGURE 3 is a cross-sectional view similar to FIGURE 1 but showing only the interior portions of a slightly different embodiment of limited slip differential according to the invention.

Referring now to FIGURE 1 of the drawings, numeral 10 generally indicates one embodiment of a limited slip differential according to the invention. Differential 10 includes a rotatable case 11 having a flange 12 to which is secured a ring gear 14. Ring gear 14 engages a drive gear 15 which is rotatably mounted along with the differential case 11 in the differential housing not shown. Drive gear 15 is drivably connectible to the driveshaft of a vehicle from which it receives and in turn supplies driving torque to the differential case 11.

The differential case 11 includes an internal cavity 16 into which lubricant carried in the differential housing can enter through openings 18 in the wall of the case. A pair of hubs 19 extend from opposite ends of the case for rotatably supporting it and are hollow as at 20 to receive the inner end portions of a pair of vehicle drive axles, not shown, which connect with the drive wheels of a vehicle.

Secured in the walls of the case 11 and extending transversely across cavity 16 is a pinion pin 21. The pin is retained in place by an elongated screw 22 and rotatably supports a pair of pinion gears 24 (only one being shown). Pinion gears 24 engage a pair of left and right side gears 25, 26 respectively rotatably received on opposite sides of the case 11.

Gears 25, 26 include internally splined bores 28 arranged to drivingly engage the mating splines of the vehicle drive axles, not shown. The gears further include extending hub portions 29 rotatably received in counterbores 30 of the case. Radially extending surfaces 31 of the gears are located adjacent the inner ends of the hubs 29 and extend in opposed relation to radially extending surfaces 32 of the case formed annularly around the counterbores 30.

Intermediate the opposed surfaces 31, 32 of each gear and the case is a pack 34 of clutch plates. Each pack 34 is composed of alternately disposed inner and outer annular plates 35 and 36 respectively. Inner plates 35 are internally splined and engage external splines 38 formed on the outer surfaces of hubs 29 so as to be rotatably driven with the gears 25, 26. Outer plates 36 have tangs or ears 39 formed on their outer perimeters which are received in retaining means 40 of the case. The retaining means may be grooves formed in the case 11 or inserts received in such grooves. Plates 36 are thus retained in the case for rotation therewith.

Between clutch packs 34 and the surfaces 31 of the adjacent side gears 25, 26 are hydraulic actuating means comprising expansible chamber devices 41, 41a. Device 41 is shown in FIGURE 2 and comprises an annular cylinder member 42 and an annular piston member 44 which is received for reciprocating movement in the cylinder 42 along the line of the rotational axis of case 11. Piston 44 has a pressure developing surface 45 across which extends a plurality of radial fluid receiving grooves 46. Extending in clockwise and counterclockwise directions from each groove 46 are shallow trapezoidally shaped depressions 48 and 49 respectively. These depressions may, for example, be on the order of 2½ ten-thousandths of an inch deep and coact with the grooves 46 to form stepped land thrust bearings developed in accordance with known formulae and capable upon relative rotation with an opposing surface in the presence of a suitable fluid, preferably a lubricant, of developing substantial hydraulic pressures. The pressures are developed in the depressions which extend in the direction of relative rotation of the opposing surface and reach a maximum at the small end of the trapezoidal depressions opposite from the grooves 46. At the maximum pressure point at the end of each clockwise extending depression 48 a small opening 50 connects each depression 48 with the other side of the piston 44. Feed grooves 46 and stepped lands 48 thus comprise hydrodynamic bearing pump means which feed pressurized fluid through openings 50 to the other side of the piston. Piston 44 also includes ears 51 which are received in retaining means 40 of the case to fix the rotational position of the piston with respect thereto.

Expansible chamber device 41a is similar to device 41 except that its annular piston member 44a has the positions of depressions 48 and 49 reversed so that openings 50 are located counterclockwise from their respective grooves 46 at the ends of depressions 48.

Cylinder member 42 includes an annular end wall 52 connecting with inner and outer circular walls 54 and 55 respectively. The circular walls 54, 55 extend axially outward from the end wall 52 to form an annular channel 56 in which piston member 44 is closely but reciprocably received so that fluid fed by stepped lands 48 through openings 50 is discharged into channel 56. Walls 54, 55 include slots 58 aligned with grooves 46 of the piston as installed and wall 55 includes a pair of wider slots 59 which receive ears 51 to index and prevent relative rotation of the cylinder and piston members.

Disposed at the inner and outer peripheries of channels 56 are inner and outer seal ring members 60 and 61 respectively. Seals 60, 61 are preferably in the form of O-rings formed of a resilient oil resistant material and are slightly compressed in their installed positions so as to provide a light pre-load, urging the pistons 44, 44a outwardly from their cylinders 42 as well as sealing the annular clearances between the pistons and cylinders. The light pre-load force need be sufficient only to hold the pressure developing surfaces 45 of the pistons 44, 44a closely against their opposing side gear surfaces 31 so that fluid pressure may be developed as will be subsequently described. For reasons subsequently noted, it is important that the area of the piston facing the channel 56 and exposed to fluid pressure therein be at least about as large as, and preferably larger than, the total area of the pressure developing stepped lands 48 on the other side of the piston.

Finally, a metal spacer block 62 is disposed between the side gears 25, 26 and the pinion gears 24 to limit their inward movement. A transverse opening 64, in the spacer block, provides a close fit around the pinion pin 21 so that the spacer block remains essentially fixed, preventing axial movement inwardly of the side gears 25, 26.

The operation of the limited slip differential embodiment above described is as follows: Rotation of drive gear 15 by a power source causes the rotation of differential case 11 on its hubs 19 which, through pinion pin 21, causes pinion gears 24 to orbit around the rotational axis of the case. If the differential is in a vehicle traveling straight ahead with drive wheels of equal effective diameter then both side gears 25, 26 will be rotated on their axes at equal speeds, identical to the rotational speed of the case 11. However, during normal turning movements of the vehicle a small difference in wheel speeds will occur causing relative rotation of the side gears and pinion gears with respect to one another and to the case 11. Under such circumstances the relative rotational speeds are comparatively low and little, if any effect will be noted in the hydraulic actuators and clutch packs. Thus, in such circumstances, torque will be delivered approximately equally to the two drive wheels.

When, however, a condition arises where one of the drive wheels loses traction, so that it slips and is accelerated to a substantially higher rotational speed than the other drive wheel, the relative rotation of the side gear surfaces 31 with respect to the pressure developing surfaces 45 of their respective annular piston members 44, 44a causes the lubricant film between the surfaces to develop a substantial hydraulic pressure in the stepped land depressions which extend from grooves 46 in the direction of relative travel of each side gear with respect to its piston.

Assuming the direction of travel and slippage of one wheel are such as to cause relative rotation of both side gears in clockwise directions over the surfaces of their respective pistons as viewed from pinion pin 21, a pressure will be developed in depressions 48 of the bearing pump means of piston 44 and transmitted through openings 50 to the interior of channel 56 where it acts against the piston and cylinder members of the right-hand expansible chamber device 41 urging them outwardly and compressing the plates of the right-hand clutch pack 34.

Since maximum pressures developed in the stepped land depressions 48 are transmitted into channel 56 and additionally, since the area of the piston exposed to pressure in the channel is preferably greater than the area of depressions 48, the force developed on the channel side of the piston is greater than that developed on the stepped land side. This urges the piston pressure developing surface 45 toward the side gear surface 31 which reduces the oil film thickness between them. The reduction in oil film thickness causes a higher pressure to be developed in the stepped land depressions 48 which, in turn, increases fluid pressure in the channel 56 still further.

This action and reaction quickly develops a significant hydraulic pressure in the channel which acts on the clutch pack 34 so as to develop frictional resistance that limits relative rotation of side gear 26 with respect to the casing 11 and, through the pinion gears 24, likewise limits relative rotation of the other side gear 25 with respect to the casing. With a proper design relationship, the friction force of the clutch will be sufficient to overcome the wheel spin condition before pressures developed cause wear or damage due to metal to metal contact of the piston and side gear surfaces.

During the above described action, relative rotation of side gear 25 in a clockwise direction over the surface 45 of its annular piston 44a as viewed from the pinion pin 21 will develop a hydraulic pressure in the depressions 49 of that piston. These depressions do not connect with openings 50. Thus this action will provide a pressurized lubricant film to reduce wear between the surfaces but it will not act to actuate the left-hand clutch pack 34.

If on the other hand, slippage of the wheels is such that the relative rotations of the side gears with respect to their annular pistons are in counterclockwise directions, as viewed from the pinion pin 21, then a hydraulic pressure will be developed in the left-hand expansible chamber device 41a actuating the left-hand clutch pack 34 while the right-hand expansible chamber device 41 will remain unpressurized and the clutch pack will not be actuated. In this instance, resistance to relative rotation of both side gears with respect to the case will be developed only in the left-hand clutch pack but in substantially the same manner as described above.

Referring now to FIGURE 3 of the drawings, there is shown an embodiment of limited slip differential similar to that of FIGURES 1 and 2 but differing in a number of important aspects. In order to save unncessary repetition, like reference numerals are used for elements identical to those of FIGURES 1 and 2.

One significant change in the embodiment of FIGURE 3 is that the spacer block 65 has an enlarged transverse opening 66 through which the pinion pin 21 extends. Opening 66 may be either oblong in a direction along the rotational axis of the case 11 or merely circular. In either case it permits some axial movement of the spacer block. This change has the effect that when one of the expansible chamber devices 41, 41a is pressurized by the hydraulic action of the hydrodynamic bearing pump means, as previously described, it not only actuates its associated clutch pack 34 but it moves its associated side gear inwardly against the spacer block, moving the spacer block axially and thereby forcing the opposite side gear outwardly so as to compress the opposite expansible chamber device and its associated clutch pack. In this way the pressurizing of either one of the expansible chamber devices is made to actuate both clutch packs.

An additional change in the embodiment in FIGURE 3 over that of FIGURES 1 and 2 is in the construction of the annular cylinder member 68 which differs from the cylinders 42 of FIGURES 1 and 2 in that the grooves 58 and 59 are eliminated and ears 69 are added on the outer peripheries of the cylinder members 68. The elimination of grooves 59 causes the piston members to extend out of their respective cylinder members an amount not less than the thickness of ears 51 of the pistons and thus permit fluid to reach radial grooves 46 without the need for grooves like 58 in the circular walls of the cylinders 68. The ears 69 of cylinders 68 engage the retaining means 40 of the case to prevent relative rotation of the cylinder with respect to its piston and the differential case.

Also, within the ears 69, counterbores 70 are provided in which packs 71 of Belleville springs are disposed. These springs exert a small pre-load force on the ears 51 of the associated pistons. In view of this the right and left annular pistons 72, 72a are modified slightly from pistons 44, 44a of FIGURES 1 and 2 in that the inner surfaces are grooved as at 75 to receive the O-ring seals 76. These seals thus move with the piston and do not provide any pre-loading of the assembly as do the seals 61 of FIGURE 1.

It should be apparent that the embodiment of FIGURE 3 operates in the same manner as that of FIGURE 2 except for the differences noted above and further description should not be necessary. The changes in the pistons and cylinders provide some of many possible alternate arrangements of expansible chamber devices for accomplishing the same purpose as the arrangement of FIGURES 1 and 2. Obviously numerous changes in construction and pre-load springs could be made without significantly affecting the operation of these devices.

Figure 4:
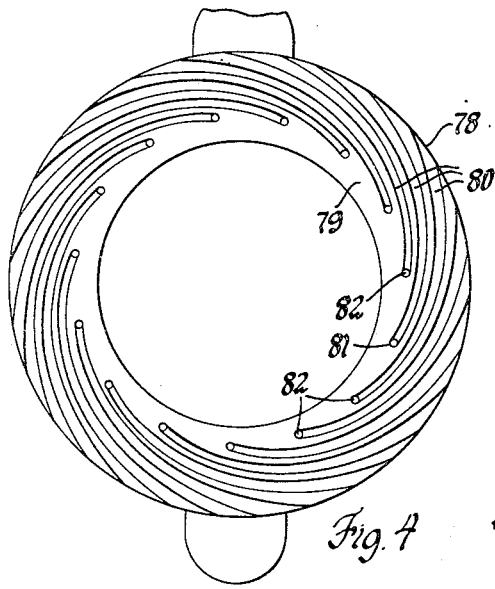
FIGURE 4 is an alternative embodiment of a piston member for use in an expansible chamber device of the type shown in F'GURE 2 but having a different type of hydrodynamic bearing means.

FIGURE 4 shows an alternative embodiment of a right annular piston member 78 which could be used in the embodiments of either FIGURES 1 or 3 replacing pistons 44 or 74. Piston 78 differs from those previously discussed in the type of hydrodynamic pump arrangement utilized. In this piston the well known spiral groove thrust bearing concept is applied by forming, on the pressure developing surface 79, a plurality of grooves 80 spiraling inwardly in a clockwise direction from the outer edge of the piston member 78 to terminating points 81 spaced from the inner edge of the piston. At the inner end of each groove, an opening 82 connects the groove with the other side of the piston member. Like the stepped lands 48, 49 of the pistons, previously discussed, spiral grooves 80 are relatively shallow, extending in depth only a few ten-thousandths of an inch. The actual dimension will be determined by the desired pressure to be developed under the intended operating conditions in accordance with known formulae. The piston 78 could be installed in the same manner as the pistons of previously described FIGURES 1 through 3.

In operation, rotation of an opposing surface clockwise against the pressure developing surface 79 of piston 78 in the presence of suitable fluid draws fluid inwardly along the spiral grooves 80 and develops a substantial fluid pressure therein. This pressure is then transmitted through openings 82 into the interior of the expansible chamber device.

Figure 5:
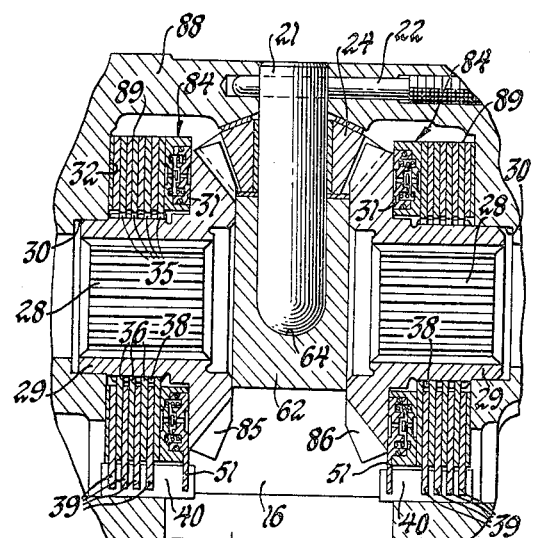
FIGURE 5 is a cross-sectional view similar in character to that of FIGURES 1 and 3 but showing a third embodiment of limited slip differential arranged in accordance with the invention.
Figure 6:
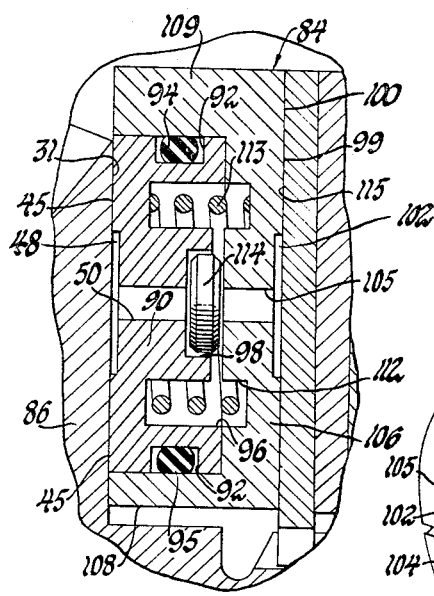
FIGURE 6 is an enlarged view of a portion of FIGURE 5 showing details of one of the expansible chamber devices utilized in that embodiment.
Figure 7:
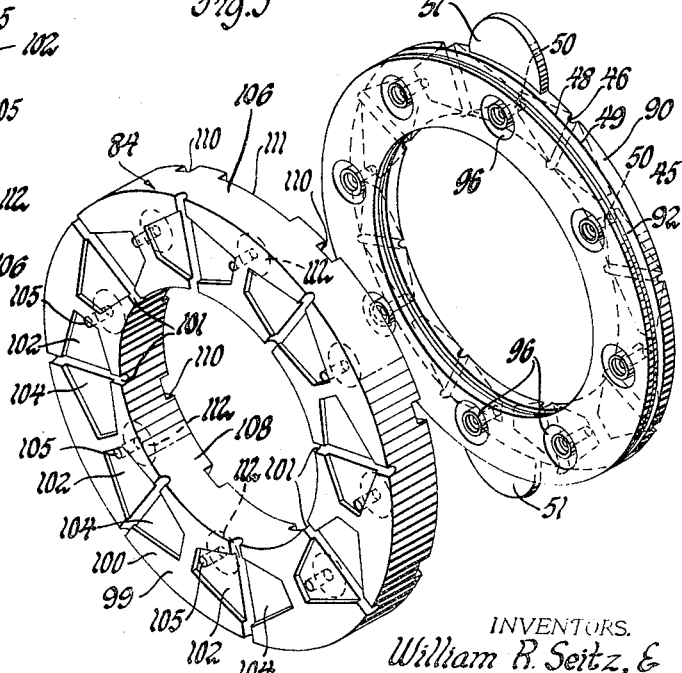
FIGURE 7 is an enlarged pictorial view of the piston and cylinder elements of one of the expansible chamber devices used in the embodiment of FIGURE 5.

FIGURES 5 through 7 disclose a third embodiment of limited slip differential which is similar in many ways to the embodiment of FIGURES 1 and 2. Thus, to simplify description, like numerals are used for like elements in the several embodiments.

The embodiment of FIGURES 5 through 7 differs from that of FIGURES 1 and 3 primarily in the construction of the expansible chamber devices generally indicated by numeral 84 and secondarily in the slight modification of the side gears 85, 86 and the differential case 88 to receive clutch packs 89 having a greater number of plates 35, 36 than the packs 34 of the first discussed embodiment. The only purpose of this latter change is to increase the friction developing surface in the clutch packs. Since it has no further significance in the operation of the unit it will not be further discussed.

The expansible chamber devices 84 differ significantly however from those previously described. They include annular piston members 90 having pressure developing surfaces 45 with radial grooves 46 and clockwise and counterclockwise shallow trapezoidally shaped depressions 48 and 49 respectively as in the previously described piston. Clockwise depressions or stepped lands 48 comprise hydrodynamic bearing pump means and connect through openings 50 with the other sides of the piston members 90. The outer and inner peripheries are provided with annular grooves 92 for receiving O-ring seals 94, 95. A plurality of annular recesses 96 are also provided surrounding the openings 50 and a small circular counterbore 98 is located within each recess at the end of its respective opening 50.

The mating annular cylinder member 99 also includes a pressure developing surface 100 which has a plurality of radial grooves 101 and clockwise and counterclockwise extending shallow trapezoidally shaped depressions or stepped lands 102 and 104 respectively. The clockwise depressions comprise hydrodynamic bearing pump means and connect with openings 105 which extend through the annular end wall 106 of the cylinder to the interior thereof. Cylinder 99 also includes inner and outer circular walls 108 and 109 respectively which sealingly engage O-rings 95, 94 when assembled with the piston member. These walls also include a plurality of grooves 110 which are aligned with grooves 46 of the piston and permit the passage of lubricant thereto. A pair of wider grooves 111 are also provided in outer wall 109 to receive the ears 51 of the piston member indexing the piston and cylinder and preventing their relative rotation.

On the inner surface of wall 106 a plurality of annular recesses 112 are provided which cooperate with recesses 96 of the piston member to receive pre-load coil spring members 113. These urge the piston and cylinder members outwardly with a light pre-load. In each piston counterbore 98 a small circular check valve 114 is located.

In this embodiment, both piston members and both cylinder members are identical with one another, although right and left hand versions, having oppositely positioned clutch pressure developing depressions, could be provided if desired.

In operation of the FIGURES 5 through 7 embodiment, relative rotation of the side gears 85, 86, with respect to the case 88, causes the development of pressure in both expansible chamber devices 84.

Assuming, for example, relative rotation of the side gear surfaces 31 in clockwise directions, as viewed from pinion pin 21, over their respective pistons a hydraulic pressure will be developed in the stepped lands 48 of each piston member which will be transmitted through passages 50 and past check valve 114 to the interior of each expansible chamber device 84. At the same time check valves 114 will be forced against openings 105 from the cylinders preventing the loss of pressure therethrough. The pressure developed in the expansible chamber devices will expand them so as to actuate their respective clutch packs in the manner described with respect to the embodiment of FIGURES 1 and 2.

If relative rotation of the side gears is in the opposite direction, that is, counterclockwise with respect to their respective pistons, no fluid pressure will be transmitted through the piston members. However, the cylinder members 99 have their pressure developing surfaces 100 opposing surfaces 115 of adjacent clutch plates which will move with the side gears in clockwise directions over the surfaces 100, as viewed from outboard thereof. Thus hydraulic pressure will be developed in the stepped lands 102 of each cylinder member and will be transmitted through passages or openings 105 to the interior of its respective expansible chamber device. In this way, both expansible chamber devices will be pressurized and both clutch packs actuated. Check valves 114 will, of course, act to close off the openings 50 to prevent loss of pressure therethrough under this operating condition.

In either direction of operation, one pressure developing surface is not developing pressure in its hydrodynamic bearing pump means which are being moved in the wrong direction. The oppositely directed stepped lands on this surface will, however, develop pressure to reduce wear of the surface itself while rotating in this direction. This pressure will, of course, not be transmitted outside these stepped lands themselves.

From the foregoing description it should be apparent that numerous changes could be made in the various inventive arrangements and devices disclosed herein within the spirit and scope of the inventive concepts taught.

We claim:

1. A hydraulic actuator movable in response to the relative rotation of two members, said actuator comprising
hydrodynamic bearing pump means in one of said members and having a pressure developing surface opposing a relatively rotatable surface of the other of said members, said bearing pump means being operative upon relative rotation of said surfaces to develop a hydraulic pressure therebetween,
hydraulic motor means having a fluid receiving expansible chamber and
passage means connecting the pressure developing surface of said hydrodynamic bearing pump means with said expansible chamber to transmit hydraulic pressure from the bearing pump means for actuating the hydraulic motor means.

2. The combination of claim 1 wherein said hydrodynamic bearing pump means comprise a thrust bearing having a plurality of pressure developing stepped lands and said passage means connect with the high pressure ends of said stepped lands.

3. The combination of claim 1 wherein said hydrodynamic bearing pump means comprise a thrust bearing having a plurality of pressure developing spiral grooves and said passage means connect with the high pressure ends of said spiral grooves.

4. Means for resisting relative rotation of pair of members, said means comprising
friction clutch means actuable to frictionally resist relative rotation of said members and
hydraulic actuating means ararnged to actuate said clutch means and including
hydrodynamic bearing pump means having a pressure developing surface opposing a relatively rotatable surface and arranged to rotate relative thereto upon relative rotation of said members, said bearing pump means being operative upon such relative rotation to develop a hydraulic presure betwen said opposing surfaces,
hydraulic motor means connecting with said clutch means and arranged to actuate said clutch means in response to hydraulic pressure therein and
passage means connecting the pressure developing surface of said hydrodynamic bearing pump means with said hydraulic motor means to transmit hydraulic pressure therebetween.

5. In combination with a limited slip differential having a casing adapted to be rotatably driven by input means and supporting a pair of relatively rotatable output members drivably connected through gearing to one another and to said casing,
friction clutch means actuable to frictionally resist relative rotation of said output members and hydraulic actuating means arranged to actuate said clutch means and including hydrodynamic bearing pump means having a pressure developing surface opposing a relatively rotatable surface and arranged to rotate relative thereto upon relative rotation of said output members, said bearing pump means being operative upon such relative rotation to develop a hydraulic pressure between said opposing surfaces, hydraulic motor means arranged to actuate said clutch means in response to hydraulic pressure therein and passage means connecting said hydrodynamic bearing pump means with said hydraulic motor means to transmit hydraulic pressure therebetween.

6. The combination of claim 5 wherein said hydrodynamic bearing pump means comprises a stepped land thrust bearing.

7. The combination of claim 5 wherein said hydrodynamic bearing pump means comprises a spiral groove thrust bearing.

8. A limited slip differential comprising
a fluid containing casing adapted to be rotatably driven by input means,
a pair of side gears rotatably supported in said casing and adapted for connection with a pair of relatively rotatable output members,
a pinion gear rotatably mounted in said casing and engaging said side gears to rotatably interconnect said side gears and said casing,
friction clutch means between one of said side gears and said casing and actuable to frictionally resist relative rotation of said side gears and
hydraulic actuating means arranged to actuate said clutch means and including
hydrodynamic bearing pump means connected to one of said casing and side gear members and having a pressure developing surface opposing a relatively rotatable surface of the other of said members, said bearing pump means being operative upon relative rotation of said members to develop a hydraulic pressure between said opposing surfaces,
hydraulic motor means arranged to actuate said clutch means in response to hydraulic pressure therein and
passage means connecting said hydrodynamic bearing pump means with said hydraulic motor means to transmit hydraulic pressure therebetween.

9. The combination of claim 8 wherein said hydraulic actuating means comprises an annular cylinder member and an annular piston member received for reciprocating movement in said cylinder member and defining therewith an enclosed chamber, said cylinder and said piston members comprising said hydraulic motor means and being disposed between said friction clutch means and said other of said casing and side gear members, said hydrodynamic bearing pump means and said passage means being formed as a part of one of said piston and cylinder members and connecting with said chamber to transmit hydraulic pressure thereto for urging said piston and cylinder members outwardly.

10. The combination of claim 9 and further including second hydrodynamic bearing pump means and second passage means connecting said second bearing pump means with said chamber, said second hydrodynamic bearing pump means and said second passage means being formed as a part of the other of said piston and cylinder members, said second hydrodynamic bearing pump means having a pressure developing surface opposing a relatively rotatable surface of said friction clutch means and being operative upon relative rotation of said casing and side gear members to develop a hydraulic pressure between said opposing bearing pump means and clutch means surfaces and valve means in said hydraulic motor means and arranged to close one of said first and second passage means when a pressure is being transmitted through the other.

11. A limited slip differential comprising
a fluid containing casing adapted to be rotatably driven by input means,
a pair of side gears rotatably supported in said casing and adapted for connection with a pair of relatively rotatable output members,
a pinion gear rotatably mounted in said casing and engaging said side gears to rotatably interconnect said side gears and said casing,
a pack of annular clutch plates between one of said side gears and said casing, alternate ones of said clutch plates being connected with said casing and said one side gear respectively, said clutch plates having opposed friction developing surfaces and being adapted to resist relative rotation of said side gears and said casing upon actuation by an engaging force.
hydraulic actuating means including an annular cylinder member and an annular piston member reciprocably received in said cylinder member and defining a pressure chamber therebetween, said hydraulic actuating means being disposed between said pack of clutch plates and said one side gear and being connected with said casing,
hydrodynamic bearing pump means formed on an outer surface of one of said piston and cylinder members and connected by passage means through said one member to said pressure chamber, said outer surface opposing a relatively rotatable surface of said one side gear and arranged to develop hydraulic pressure in said hydrodynamic bearing pump means upon relative rotation of said surfaces in a predetermined direction,
said hydraulic pressure being delivered through said passage means to said pressure chamber and acting upon said piston and cylinder members to compress said pack of clutch plates so as to frictionally resist relative rotation of said side gears and said casing.

12. The combination of claim 11 and further including second hydrodynamic bearing pump means formed on an outer surface of the other of said piston and cylinder members and connected by second passage means through said other member to said pressure chamber, said other member outer surface opposing a relatively rotatable surface of one of said clutch plates and arranged to develop hydraulic pressure in said hydrodynamic bearing pump means upon relative rotation of said surfaces in a predeetrmined direction opposite to said first named predetermined direction,
said hydraulic pressure being delivered through said second passage means to said pressure chamber and
valve means in said hydraulic actuating means and arranged to prevent loss of pressure from said pressure chamber through one of said passage means when pressure is being transmitted through the other.

13. A limited slip differential comprising
a fluid containing casing adapted to be rotatably driven by input means,
a pair of side gears rotatably supported in said casing and adapted for connection with a pair of relatively rotatable output members,
a pinion gear rotatably mounted in said casing and engaging said side gears to rotatably interconnect said side gears and said casing,
a pack of annular clutch plates between each of said side gears and said casing, alternate ones of the clutch plates being respectively connected with said casing and with their respective side gear, said clutch plates having opposed friction developing surfaces and being adapted to resist relative rotation of said side gears and said casing upon actuation by an engaging force,
a pair of hydraulic actuating means each including an annular cylinder member and an annular piston member received in said cylinder member and defining a pressure chamber therebetween, one of said hydraulic actuating means being disposed between each pack of clutch plates and its respective side gear and being connected with said casing, hydrodynamic bearing pump means formed on an outer surface of one of said piston and cylinder members of each hydraulic actuating means and connected by passage means through said one member to its repective pressure chamber, said outer surfaces opposing relatively rotatable surfaces of their respective side gears, one of said hydrodynamic bearing pump means being arranged to develop pressure upon relative rotation of said surfaces in one predetermined direction and the other of said hydrodynamic bearing pump means being arranged to develop hydraulic pressure upon relative rotation of said surfaces in the other predetermined direction, said hydraulic pressure being delivered through the respective passage means to its respective pressure chamber and acting upon the piston and cylinder members thereof to compress the pack of clutch plates associated therewith so as to frictionally resist relative rotation of said side gears and said casing.

14. The combination of claim 13 and further comprising a spacer block between said side gears and adapted to engage the inner faces thereof so as to transmit movement therebetween whereby the delivery of hydraulic pressure to one of said hydraulic actuating means transmits a force through the respective side gear and spacer block to the opposite side gear and actuating means to the opposite pack of clutch plates, compressing said opposite pack, whereby relative rotation of said side gears and said casing is frictionally resisted in both packs of clutch plates at the same time.

References Cited

UNITED STATES PATENTS

| | | | |
|---|---|---|---|
| 2,743,792 | 5/1956 | Ransom | 188—90 |
| 3,328,094 | 6/1967 | Muijderman | 308—9 |
| 3,340,976 | 9/1967 | Cox | 192—35 X |
| 3,376,083 | 4/1968 | Muijderman | 308—9 |
| 3,437,186 | 4/1969 | Roper | 192—35 |

LEONARD H. GERIN, Primary Examiner

U.S. Cl. X.R.

192—35, 85, 103; 308—9